(12) United States Patent
Kim

(10) Patent No.: US 6,707,969 B2
(45) Date of Patent: Mar. 16, 2004

(54) DIGITAL THERMO-OPTIC SWITCH INTEGRATED WITH VARIABLE OPTICAL ATTENUATORS

(75) Inventor: Kwang Bae Kim, Daejeon (KR)

(73) Assignee: Zen Photonics Co., Ltd., Daejeon (KR)

( * ) Notice: Subject to any disclaimer, the term of this patent is extended or adjusted under 35 U.S.C. 154(b) by 0 days.

(21) Appl. No.: 09/972,015

(22) Filed: Oct. 9, 2001

(65) Prior Publication Data

US 2002/0085791 A1 Jul. 4, 2002

(30) Foreign Application Priority Data

Oct. 10, 2000 (KR) ........................................ 2000-59604

(51) Int. Cl.[7] ................................................ G02B 6/26
(52) U.S. Cl. ............................. 385/45; 385/16; 385/28; 385/140
(58) Field of Search ............................. 385/16, 39, 45, 385/140, 28, 40

(56) References Cited

U.S. PATENT DOCUMENTS

| | | | | |
|---|---|---|---|---|
| 4,753,505 A | * | 6/1988 | Mikami et al. ................. | 385/5 |
| 5,966,493 A | * | 10/1999 | Wagoner et al. ............ | 385/140 |
| 5,970,201 A | * | 10/1999 | Anthony et al. ............ | 385/140 |
| 6,064,787 A | * | 5/2000 | Castoldi ....................... | 385/41 |
| 6,163,633 A | * | 12/2000 | Ueda ............................. | 385/16 |
| 6,205,280 B1 | * | 3/2001 | Wagoner et al. ............ | 385/140 |
| 6,222,966 B1 | * | 4/2001 | Khan et al. .................... | 385/45 |
| 6,321,009 B1 | * | 11/2001 | Klein Koerkamp .......... | 385/45 |
| 6,463,186 B1 | * | 10/2002 | Li ................................. | 385/140 |
| 6,493,478 B1 | * | 12/2002 | DeRosa et al. ............. | 385/140 |
| 2001/0055440 A1 | * | 12/2001 | Sakuma et al. ................ | 385/45 |
| 2002/0081089 A1 | * | 6/2002 | Min et al. .................... | 385/140 |
| 2002/0131664 A1 | * | 9/2002 | Bischoff et al. .............. | 385/45 |

* cited by examiner

*Primary Examiner*—Michael P. Stafira
*Assistant Examiner*—Juan D. Valentin, II
(74) *Attorney, Agent, or Firm*—Greenblum & Bernstein, P.L.C.

(57) ABSTRACT

Disclosed is a thermo-optic (TO) switch that reduces the difficulty in the fabrication process and has an excellent optical crosstalk. In the TO switch, variable optical attenuators utilizing higher-order mode generators are integrated to the both output ports of a conventional 1×2 digital TO switch of Y-branch type waveguide which uses mode evolution effect. Even when the Y-branch angle gets bigger, the inventive TO switch can maintain an excellent crosstalk without raising the switching power. Since a large Y-branch angle can reduce the difficulty in fabrication process, the inventive TO switch will increase the production rate. 1×2 optical switch is an essential device in an optical signal processing system such as optical communications, optical switches and optical sensors.

12 Claims, 2 Drawing Sheets

DIGITAL THERMO-OPTIC SWITCH INTEGRATED WITH VARIABLE OPTICAL ATTENUATORS

BACKGROUND OF THE INVENTION

1. Field of the Invention

The present invention relates to an 1×2 thermo-optic switch, and more particularly to a thermo-optical switch, which has an excellent optical crosstalk without a loss of the driving voltage while reducing a difficulty in fabricating the switch.

2. Description of the Prior Art

A conventional Y-branch type 1×2 digital optical waveguide switch is more advantageous in comparison with a Mach-Zehnder modulator, in that the Y-branch type 1×2 digital optical waveguide switch has a digital switching characteristic independent to the wavelength and the polarization, since the Y-branch type 1×2 digital optical waveguide switch utilizes a mode evolution, not a mode interference, which the Mach-Zehnder modulator utilizes.

In contrast, the digital optical switch is disadvantageous in that it is very difficult to fabricate elements of the digital optical switch, since the digital optical switch, which utilizes the mode evolution characteristic, can reveal an excellent crosstalk without any loss in a propagating transmitting mode, only when the branching angle at a Y-branch region, at which the waveguide is divided into waveguides of a fundamental mode, namely the $0^{th}$ mode, and a higher-order mode, namely the $1^{st}$ mode, is very small, generally about $0.1°$.

FIG. 1 illustrates a conventional 1×2 digital thermo-optic switch of Y-branch type using mode evolution. In FIG. 1, parameters are used as follows: $n_{clad}$ means a refractive index of a cladding layer; $n_{core}$ means a refractive index of a core layer; $E_w$ means a width of a heater; w means a width of a waveguide; α means a Y-branch angle; P means an electric power applied from the exterior; $P_{in}$ means an optical power of input light; $P_3$ means an optical power transmitting out of an upper arm 3 of a Y-branch; and $P_4$ means an optical power transmitting out of a lower arm 4 of the Y-branch.

Referring to FIG. 1, the conventional Y-branch thermo-optic switch has a waveguide construction, which comprises an input section 1 of a single mode, a Y-branch section 2 with a branching angle α, and an output section consisting of upper and lower arms 3 and 4 respectively of a single mode.

Upper and lower heaters 5 and 6, respectively for controlling the path of the propagating light, are respectively spaced apart from each of the arms with a distance δ, by which the temperature difference between both arms of the Y-branch can be maximized. In this case, the distance δ is so optimized as to maximize the difference between refractive indices of both arms when an external electric power is applied to one of the arms. The branching angle α of the Y-branch section is designed in such a manner as to maximize the crosstalk at the final output ports 3 and 4 of the thermo-optic switch while minimizing the optical loss at the Y-branch.

Mode evolution is a phenomenon, in which a propagating light undergoes a conversion from one waveguide mode into another without any optical power loss when there is a gradual change of the refractive index in the waveguide structure along the propagating direction of the waveguide.

In order to generate the mode evolution at the branching region of the Y-branch type waveguide, the branch angle α should satisfy the following Equation 1.

$$\alpha < \Delta\beta/\chi \qquad \text{Equation 1}$$

In equation 1, $\Delta\beta$ is a propagation constant difference between the $0^{th}$ mode and the $1^{st}$ mode at the branching region, and $\chi$ is attenuation constant at the Y-branch cladding region.

When electric power is applied to the upper heater 5, the temperature of the upper arm 3 increases to be larger than that of the lower arm 4, so that the refractive index of the upper arm 3 decreases to be smaller than that of the lower arm 4 (in the case where it is made from polymer material) due to the thermo-optic effect. In this case, among the light beams having transmitted through the Y-branch, the light in the $0^{th}$ order mode undergoes a mode conversion into the $0^{th}$ mode of the lower arm 4 having a relatively higher refractive index with no applied electric power, while the $1^{st}$ order mode is converted into the $0^{th}$ order mode of the upper arm 3 having a relatively lower refractive index. In this case, when all the input light beams are in the $0^{th}$ order waveguide mode, they progress into the lower arm 4. However, usually at the Y-branch region is excited a small amount of the input light in the $1^{st}$ order waveguide mode, which then progresses into the lower arm 3 to cause a crosstalk. In order to obtain a superior crosstalk, which is one of the most important characteristics in an optical switch, in other words, in order to maximize the optical output ratio between the power-applied arm 3 and the other arm 4, the amount of light guided into the waveguide output port 4, to which no electric power is applied, has to be maximized while the amount of light guided into the other waveguide output port 3 has to be minimized. The optical crosstalk X means a difference between output optical powers of the two arms and is defined as the following equation 2 when the input light is switched into the lower arm 4.

$$x = 10 * \text{Log}(P_3/P_4) \qquad \text{Equation 2}$$

On the contrary, when an external electric power is applied to the lower heater 6, the input light is outputted through the upper waveguide 3. Since the optical switch using the mode evolution as described above generally requires a very small branch angle α nearly of 0.1°, it has been very difficult to actually fabricate the conventional optical switch using the mode evolution.

SUMMARY OF THE INVENTION

Accordingly, the present invention has been made to solve the above-mentioned problems occurring in the prior art, and an object of the present invention is to provide a new structure of a digital thermo-optic switch that has an excellent crosstalk without increasing the driving voltage and also can reduce the difficulty in fabrication process by increasing the Y-branch angle.

In order to accomplish this object, there is provided a thermo-optic switch comprising: a basic Y-branch optical switch having upper and lower arms; at least one variable thermo-optic attenuator connected to at least one of the upper and lower arms of the basic Y-branch optical switch, the variable thermo-optic attenuator utilizing a higher-order mode generator; and at least one attenuator heater connected to the variable thermo-optic attenuator, so as to heat the variable thermo-optic attenuator, thereby controlling a refractive index of the variable thermo-optic attenuator.

The present invention integrates variable thermo-optic attenuators utilizing a higher-order mode generator that requires relatively low driving voltage with a conventional Y-branch type thermo-optic switch. As a result, even when the crosstalk is not good at the conventional Y-branch type thermo-optic switch output ports, the final crosstalk at the inventive optical switch output ports is excellent by removing the leaked light at the optical attenuator region.

Also, since the crosstalk of the conventional Y-branch type thermo-optic switch itself is not critical, the Y-branch angle can be increased and by increasing the branch angle the electrode length of a conventional Y-branch type optical switch can be decreased. Since this decreased length of the electrode is about same size as the newly added length of electrode for variable thermo-optic attenuators, the driving voltage of the present invention does not increase as a whole. In addition to this, by increasing the branch angle, the difficulty of fabrication process decreases and the size of the whole device decreases.

Improvement of the crosstalk characteristics while reducing the difficulty in fabrication process of a conventional Y-branch type digital optical switch can be achieved by integrating variable optical attenuators at the end of both arms of output ports to remove the residual light which leaked through the off-state arm at the Y-branch of a conventional 1×2 optical switch. This general structure, however, has disadvantage of requiring very large driving voltage because it needs to drive optical attenuators in addition to the conventional optical switch.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
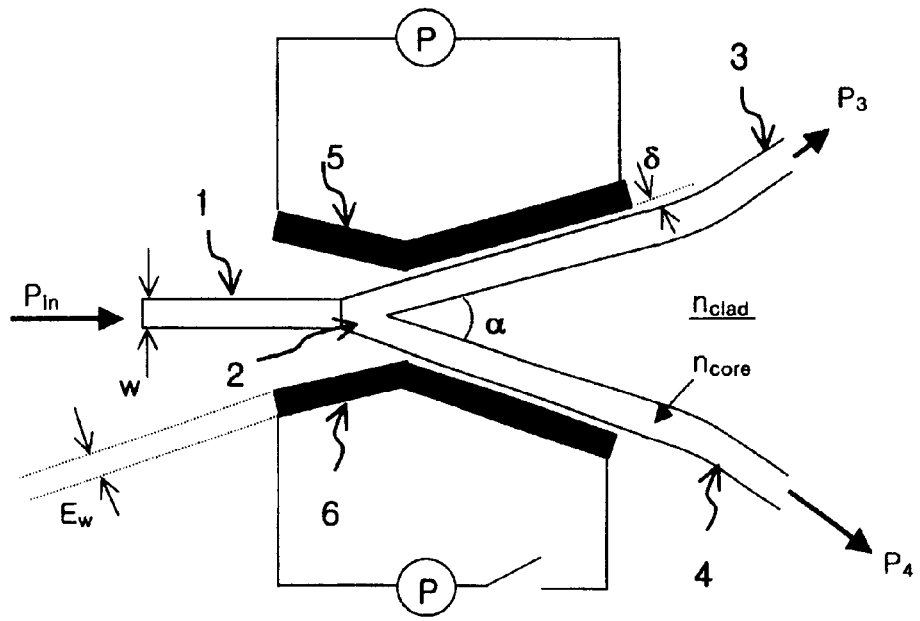
FIG. 1 is a constructional view of a conventional thermo-optic switch.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 2:
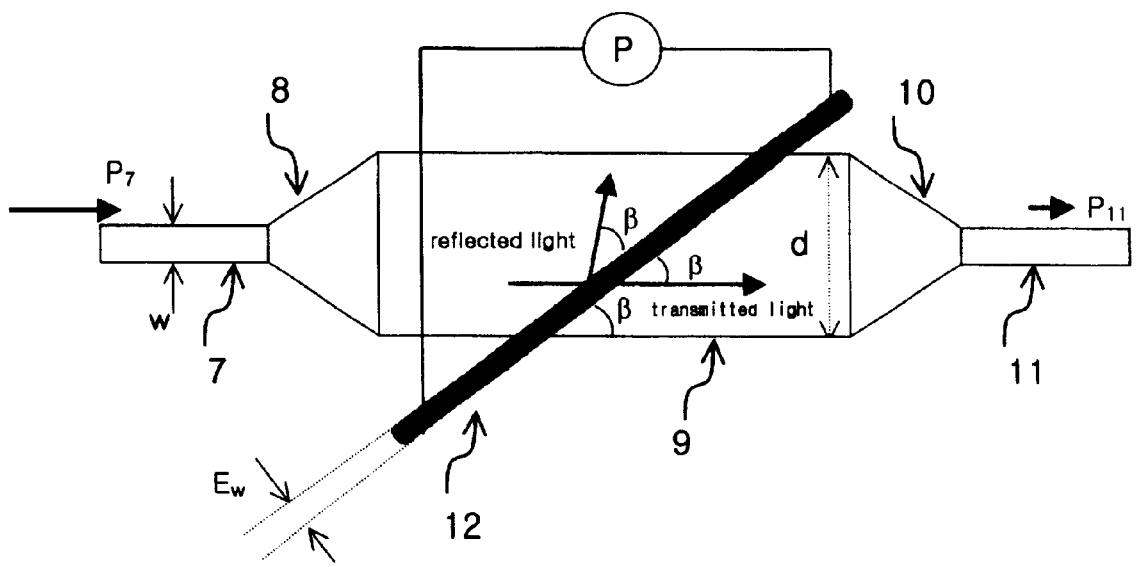
FIG. 2 is a constructional view of a variable thermo-optic attenuator employed in the present invention, which utilizes a higher-order mode generator.

FIG. 2 illustrates a variable thermo-optic attenuator utilizing a higher-order mode generator. In FIG. 2, parameters are used as follows: $E_w$ means a width of a heater; w means a width of a waveguide; β means an angle between a heater and a waveguide; d means a width of a multimode waveguide; P means an electric power applied from the exterior; $P_7$ means an optical power transmitting into the variable optical attenuator; and $P_{11}$ means an optical power transmitting out of the variable optical attenuator.

Referring to FIG. 2, the variable optical attenuator comprises single mode input/output passive waveguides 7 and 11, multimode waveguide region 9 capable of waveguiding higher-order mode, tapered regions 8 and 10 respectively connecting the single mode waveguides 7 and 11 to the multimode waveguide region 9 without optical loss, and heaters disposed with an inclination β with respect to waveguides.

In the present embodiment, the waveguide is made from polymer material, which has a thermo-optic characteristic where the refractive index decreases as temperature increases. The operating principle of the variable optical attenuator shown in FIG. 2 is as follows.

The light having transmitted through the single mode waveguide 7 of the input region progresses through the tapered region 8 into the multi-mode generator region 9 in a $0^{th}$ mode of the multi-mode generator region 9 without optical power loss.

When no external electric power is applied to the heater 12, the light having transmitted through the multimode generator region 9 goes on progressing through the tapered region 10 at the output section, during which the light undergoes a mode conversion into the $0^{th}$ mode of the single mode waveguide at the output unit without optical power loss. In result, the light passes through the attenuator without any attenuation.

In contrast, when current flows through the heater, the temperature of the waveguide beneath the heater increases and thus the refractive index of the waveguide decreases in proportion to the temperature change.

In this case, a portion of the light passing beneath the heater is reflected at a boundary of the heater with an angle β, which is the same as the incident angle. In result, the reflected light propagates in an angle 2β with respect to the original propagation direction of the light in the waveguide.

When the light reflected with the angle of 2β has a propagation angle larger than that of the $1^{st}$ order mode of the multimode waveguide, order modes higher than the $1^{st}$ order modes are excited in the multimode waveguide region. These higher-order modes are removed at the tapered region 10 of the output region and again at the single mode waveguide 11 of the output region, and consequently the input light attenuates as a whole.

Therefore, as the quantity of the current flowing through the heater is increased, the amount of the reflected light is also increased, so that a more quantity of the input light is attenuated. Accordingly, there is provided a variable optical attenuator, in which the intensity of the input light can be controlled according to the quantity of the electric power applied to the heater. In this case, the attenuation rate Y of the variable optical attenuator can be obtained by the following Equation 3.

$$Y=10*\text{Log}(P_7/P_{11}) \qquad \text{Equation 3}$$

Figure 3:
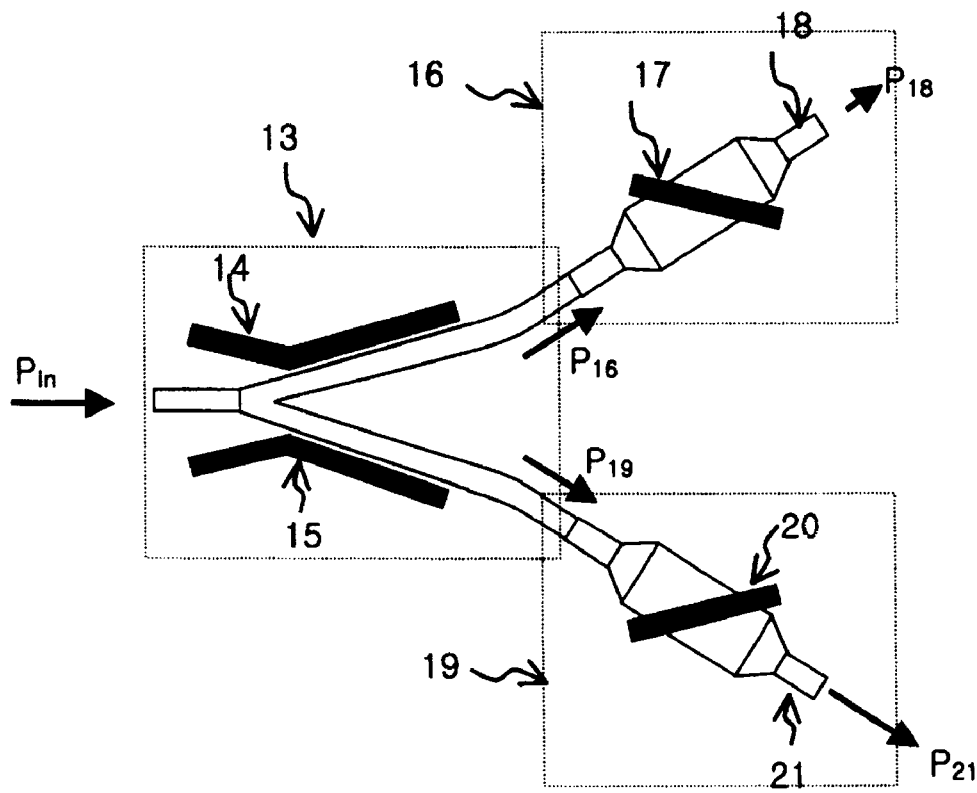
FIG. 3 is a constructional view of a digital thermo-optic switch according to an embodiment of the present invention, which has two variable optical attenuators as shown in FIG. 2.

FIG. 3 illustrates a digital thermo-optic switch according to an embodiment of the present invention, which has two variable optical attenuators as shown in FIG. 2. In FIG. 3, parameters are used as follows: $P_{in}$ means an input optical power; and $P_{16}$, $P_{18}$, $P_{19}$, $P_{21}$ respectively mean optical powers propagating through each section of the waveguide.

In other words, FIG. 3 shows a structure of a digital Y-branch type thermo-optic switch 13 integrated with two variable optical attenuators 16 and 19. The operation principle of the thermo-optic switch 13 is as follows.

When no electric power is applied to the heaters 14, 15, 17, and 20 of the thermo-optic switch 13, the input light propagating through the Y-branch optical switch 13 is divided into two waveguides in 3 dB, and then each of the divided light propagates through variable optical attenuator without any attenuation. As a result, the device operates as a 3 dB optical splitter.

However, when electric power is applied to the upper heater 14 of the Y-branch optical switch 13, the input light is switched into the lower arm of the Y-branch optical switch 13 to propagate into the lower variable optical attenuator 19 as described above. However, as already mentioned above, not all of the input light propagates through the lower port of the Y-branch optical switch 13, but a portion of the input light leaks into the attenuator 16 because of the intrinsic crosstalk of the Y-branch optical switch 13. In this case, when an external electric power is applied to the heater 17 of the attenuator 16, the leaking light is removed from the attenuator 16, so that the crosstalk in the whole optical switch will be reduced. Therefore, the final crosstalk Z of the optical switch according to the present invention can be expressed as a sum of the crosstalk X in the Y-branch switch and of the crosstalk Y in the optical attenuators.

$$Z = X + Y$$

$$X = 10 * \text{Log}(P_{16}/P_{18}),$$

$$Y = 10 * \text{Log}(P_{18}/P_{16}) \quad \text{Equation 4}$$

That is, the total crosstalk of the switch of the invention increases by a quantity as much as the attenuation rate Y due to the attenuator, in comparison with the conventional Y-branch type switch. In other words, when the external electric power is simultaneously applied only to the heaters 14 and 17, the light propagates mainly through the attenuator 19 at the lower arm, and the rest light, which leaks into the attenuator 16, is secondly removed by the attenuator 16. In result, the entire switch of the invention has an improved crosstalk characteristic. By the same token, when external electric power is applied simultaneously into heaters 15 and 20, the same principle of operation is applied.

Therefore, excellent optical crosstalk characteristics can be maintained even when the branch angle at the Y-branch is increased within a limit, which is allowed by an optical loss caused according to the increase of the branch angle at the Y-branch. Also, by increasing the Y-branching angle, there is obtained an additional advantage that the length of the Y-branch optical switch is shortened.

Figure 4:
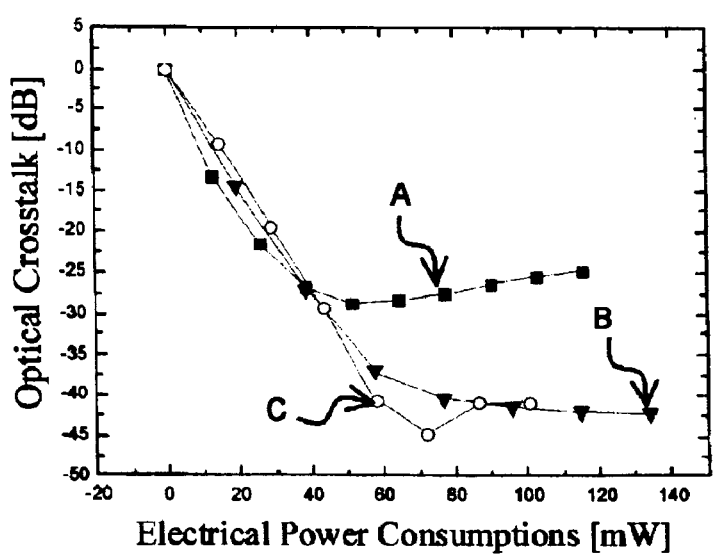
FIG. 4 is a graph for showing a comparison between the switching characteristics of the inventive switch and the conventional Y-branch 1×2 switch by means of the beam propagation method (BPM) computer simulation.

FIG. 4 shows a comparison between the switching characteristics of the inventive switch and the conventional Y-branch 1×2 switch by means of the beam propagation method (BPM) computer simulation. In FIG. 4, curve A represents the characteristic of the conventional Y-branch optical switch with a Y-branch angle $\alpha = 0.11°$, wherein values of the parameters used in the BPM simulation are as follows: wavelength $\lambda_0 = 1.55$ μm; $n_{clad} = 1.4856$; $n_{core} = 1.4937$; $\delta = 7$ μm; w=7 μm; and $E_w = 7$ μm.

Curve B represents the characteristic of the switch according to the present invention, which has variable optical attenuators with a Y-branch angle $\alpha = 0.11°$, wherein values of parameters for the Y-branch switch are as follows: wavelength $\lambda_0 = 1.55$ μm; $n_{clad} = 1.4856$; $n_{core} = 1.4937$; $\delta = 7$ μm, w=7 μm; and $E_w = 7$ μm, while values of the parameters for the variable optical attenuator are as follows: $\beta = 1.6°$; d=40 μm; $E_w = 7$ μm; and the heater length is 4000 μm.

Curve C is the characteristics of the present inventive device with Y-branch angle $\alpha = 0.2°$, wherein values of parameters for the Y-branch switch are as follows: wavelength $\lambda_0 = 1.55$ m; $n_{clad} = 1.4856$; $n_{core} = 1.4937$; $\delta = 7$ μm; w=7 μm; and $E_w = 7$ μm, while values of the parameters for the variable optical attenuator are as follows: $\beta = 1.6°$; d=40 μm; $E_w = 7$ μm; and the heater length is 4000 μm.

As shown, the conventional Y-branch optical switch shows a crosstalk of about −30 dB at about 60 mw switching power, and the inventive switch shows an improved crosstalk not larger than −40 dB at about 70 mW. Referring to Curve C, which shows the crosstalk characteristic of the inventive optical switch having $\alpha = 0.2°$, the crosstalk characteristics and the switching power are maintained regardless of the increase of the branching angle.

In the thermo-optic switch according to the present invention as described above, a constant switching power and an improved crosstalk are maintained when the Y-branching angle is the same as or even bigger than that of the conventional Y-branch optical switch. Therefore, according to the present invention, the Y-branching angle can be increased while all the characteristics are maintained same, so that yield of the thermo-optic switch can be considerably improved, and thereby the thermo-optic switch of the invention is advantageous in mass production.

Although a preferred embodiment of the present invention has been described for illustrative purposes, those skilled in the art will appreciate that various modifications, additions and substitutions are possible, without departing from the scope and spirit of the invention as disclosed in the accompanying claims.

The present disclosure relates to subject matter contained in priority Korean Application No. 10-2000-0059604, filed on Oct. 10, 2000, which is herein expressly incorporated by reference in its entirety.

What is claimed is:

1. A thermo-optic switch comprising:

a basic Y-branch optical switch having upper and lower arms;

at least one variable thermo-optic attenuator connected to at least one of the upper and lower arms of the basic Y-branch optical switch, the at least one variable thermo-optic attenuator utilizing a higher-order mode generator;

at least one attenuator heater disposed on the at least one variable thermo-optic attenuator, so as to heat the at least one variable thermo-optic attenuator, thereby controlling a refractive index of the at least one variable thermo-optic attenuator, and wherein the at least one variable thermo-optic attenuator comprises a single mode input passive waveguide, and a multimode waveguide connected to the single mode input passive waveguide, the multimode waveguide having a larger width than the single mode input passive waveguide and being capable of waveguiding at a higher-order mode.

2. The thermo-optic switch as claimed in claim 1, wherein the thermo-optic switch further comprising upper and lower heaters connected to the basic Y-branch optical switch, so as to heat to the basic Y-branch optical switch.

3. The thermo-optic switch as claimed in claim 1, wherein the at least one attenuator heater is disposed with a predetermined inclination with respect to the at least one variable thermo-optic attenuator.

4. The thermo-optic switch as claimed in claim 1, wherein the at least one variable thermo-optic attenuator includes upper and lower variable thermo-optic attenuators respectively connected to the upper and lower arms of the basic Y-branch optical switch; and the at least one attenuator heater includes upper and lower attenuator heaters respectively connected to the upper and lower variable thermo-optic attenuators, so as to respectively heat the variable thermo-optic attenuator.

5. The thermo-optic switch as claimed in claim 4, wherein the external electric power is simultaneously applied to an upper heater connected to the basic Y-branch optical switch and to the upper attenuator heater to switch an input light into an output port; and wherein external electric power is simultaneously applied to a lower heater connected to the basic Y-branch optical switch and to the upper attenuator heater to switch the input light into another output port.

6. The thermo-optic switch as claimed in claim 1, wherein the at least one variable thermo-optic attenuator is fabricated with polymer.

7. The thermo-optic switch as claimed in claim 1, wherein the at least one variable thermo-optic attenuator is fabricated with silica.

8. The thermo-optic switch as claimed in claim 1, wherein the at least one variable thermo-optic attenuator further comprises a single mode output passive waveguide which has a smaller width than the multimode waveguide, and a tapered region respectively connecting the single mode waveguide to the multimode waveguide without optical loss, and wherein the at least one attenuator heater is disposed with an inclination with respect to the multimode waveguide.

9. A thermo-optic switch comprising:

a basic Y-branch optical switch having upper and lower arms;

upper and lower heaters provided at the basic Y-branch optical switch, so as to heat to the basic Y-branch optical switch;

upper and lower variable thermo-optic attenuators respectively provided at the upper and lower arms of the basic Y-branch optical switch, the variable thermo-optic attenuators utilizing a higher-order mode generator;

upper and lower attenuator heaters respectively disposed on the upper and lower variable thermo-optic attenuators in such a manner that the upper and the lower attenuator heaters are disposed with predetermined inclinations with respect to the upper and the lower variable thermo-optic attenuators, so as to respectively control degrees of heating the variable thermo-optic attenuators, thereby controlling refractive indices of the upper and the lower variable thermo-optic attenuators, and wherein each of the upper and lower variable thermo-optic attenuators respectively comprise a single mode input passive waveguide, and a multimode wave guide connected to the single mode input passive waveguide, the multimode waveguide having a larger width than the single mode input passive waveguide and being capable of waveguiding at a higher-order mode.

10. The thermo-optic switch as claimed in claim 9, wherein each of the upper and lower variable thermo-optic attenuators respectively further comprise a single mode output passive waveguide which has a smaller width than the multimode waveguide, and a tapered region respectively connecting the single mode waveguide to the multimode waveguide without optical loss, and wherein each of the upper and lower attenuator heaters are disposed with an inclination with respect to the multimode waveguide.

11. The thermo-optic switch as claimed in claim 9, wherein the upper and lower variable thermo-optic attenuators are fabricated with polymer.

12. The thermo-optic switch as claimed in claim 9, wherein the upper and lower variable thermo-optic attenuators are fabricated with silica.

* * * * *